UNITED STATES PATENT OFFICE.

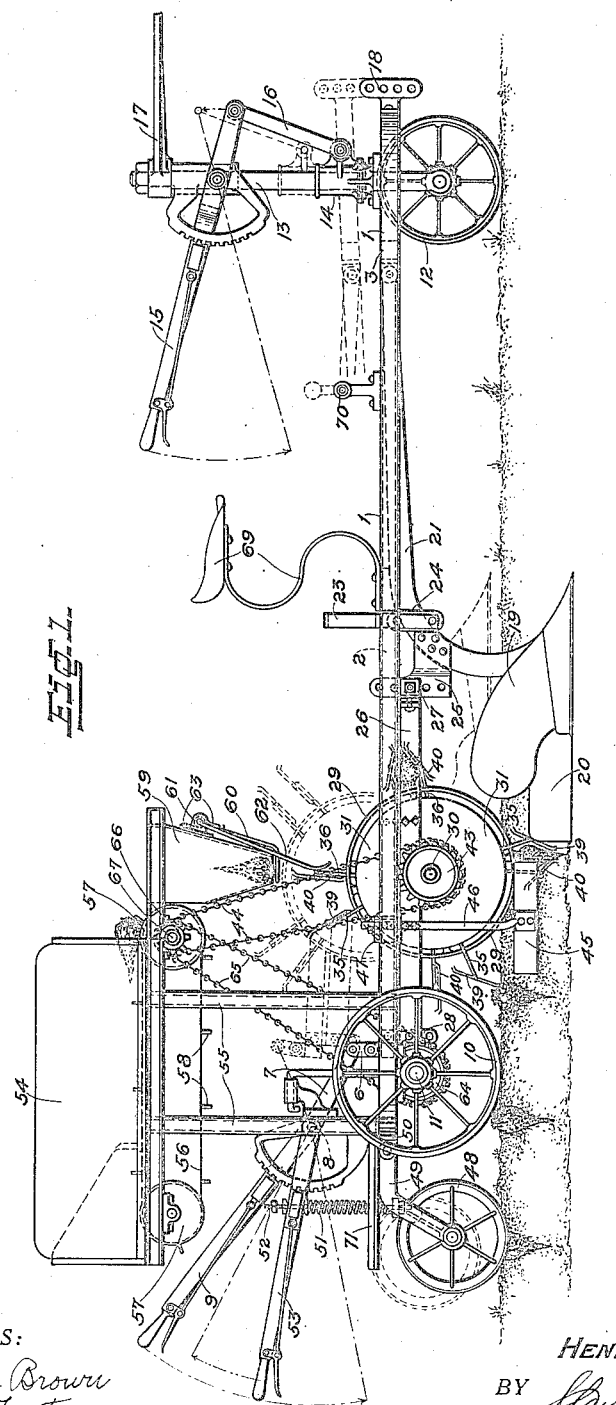

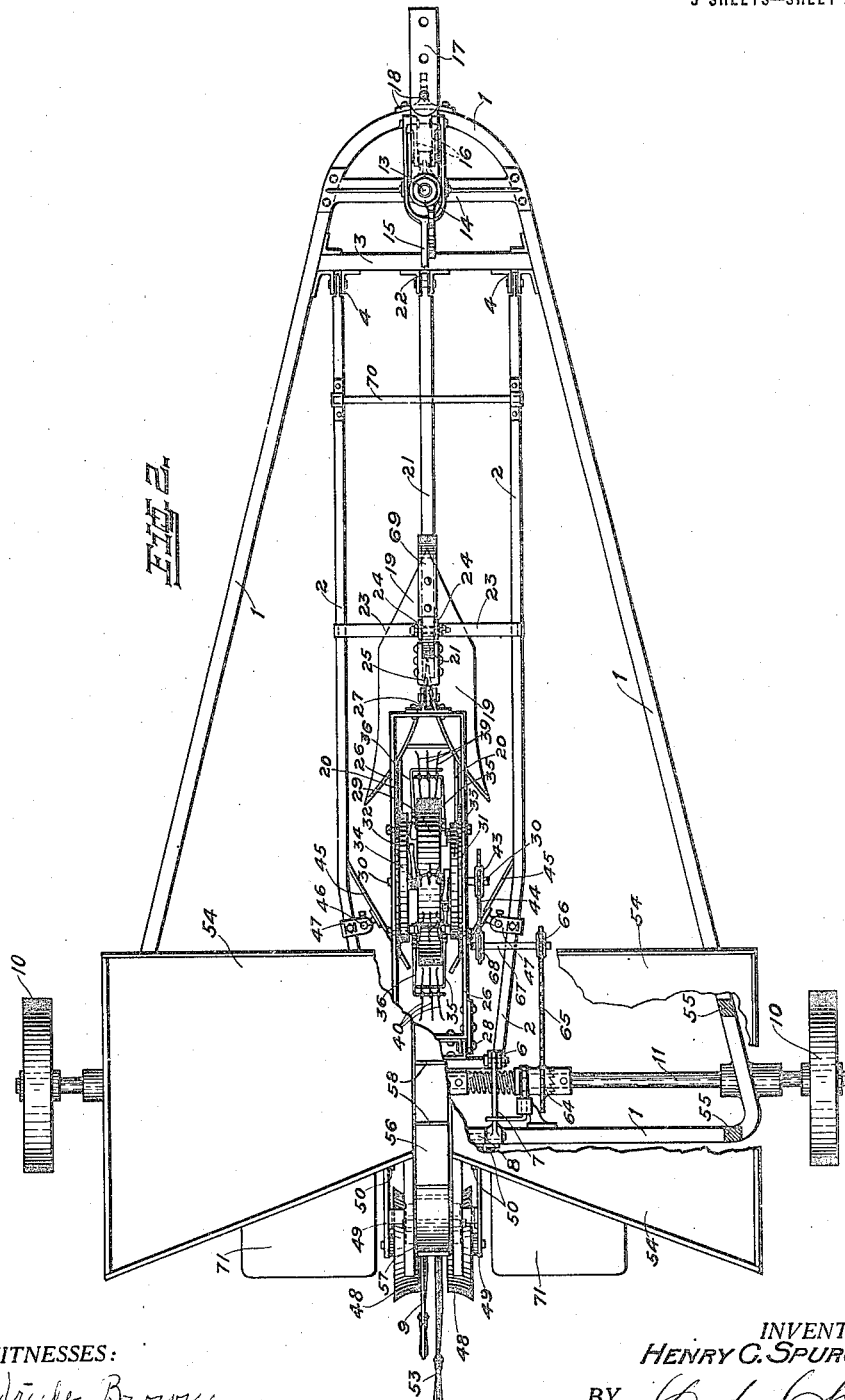

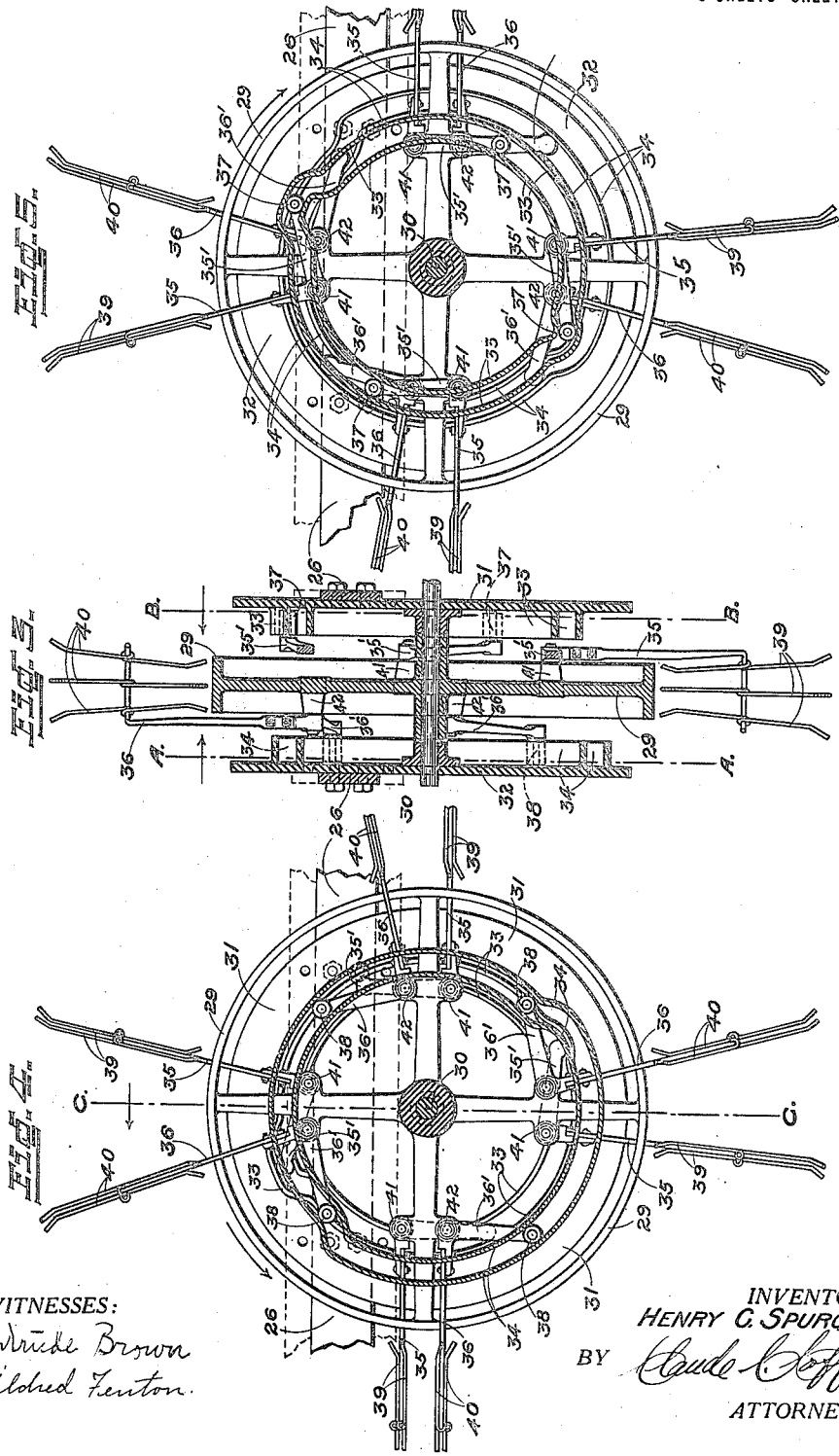

HENRY C. SPURGEON, OF LONGMONT, COLORADO.

BEET-PLANTER.

1,176,324. Specification of Letters Patent. Patented Mar. 21, 1916.

Application filed May 6, 1915. Serial No. 26,287.

*To all whom it may concern:*

Be it known that I, HENRY C. SPURGEON, a citizen of the United States, residing at Longmont, in the county of Boulder and State of Colorado, have invented a new and useful Improvement in Beet-Planters, of which the following is a specification.

My invention relates to improvements in planters for planting seed beets or other biennial plants or roots and is adapted especially for planting or setting out sugar beets for seed raising purposes.

The objects of my invention are to provide a planter that will accurately and automatically plant the beets or other roots to be planted in a careful and certain manner at proper spaces in a row and firmly pack the soil about the planted root.

Having reference to the accompanying drawings: Figure 1 is a side view of a planter constructed according to my invention, the dotted lines on the figure indicating the inoperative position of the parts. Fig. 2 is a top view of a planter with parts cut away. Fig. 3 is an enlarged vertical cross section of the planter wheel on line C—C of Fig. 4 viewed in the direction of the arrow. Fig. 4 is a cross section on line A—A of Fig. 3 viewed from the left of Fig. 3. Fig. 5 is a cross section on line B—B of Fig. 3 viewed from the right of Fig. 3.

Like numerals throughout the several figures refer to like parts.

In general my invention consists of a two-way or list plow adjustably set to make a furrow to receive the beets or other roots to be planted. Behind the plow a planter wheel of special construction automatically places a root in its position between wings extending back from the plow and holds the root in position as the soil slides and is pressed against it. Immediately following and at the side of the planter wheel are filling blades or scrapers to scrape the soil back into place in the furrow and against the planted roots. Following the filling blades is a pair of presser wheels adapted to straddle the row and press the soil firmly in place about the plants. Means are provided to feed plants to the planter wheel from a suitable hopper. The invention will be explained herein with reference to its use in planting sugar beets.

In the construction according to my invention I provide a main frame 1 preferably of approximately triangular shape, as shown in Fig. 2. This may be of square piping or angle iron or other material as desired. Inside the main triangular frame 1 is a substantially rectangular subframe 2 pivoted at its front end at 4 to a cross piece 3 near the front end of the main frame.

Subframe 2 is adapted to carry the plow, the planter wheel, and the filling blades or scrapers and is hung at its back end by two links 6 pivoted at the back corners of the subframe and hung from arms 7 suitably pivoted at 8 in the main framework of the machine and fastened to an adjusting lever 9. From this arrangement it will be seen that the back end of the subframe 2 may be raised or lowered by lever 9.

The back end of main frame 1 is carried on a shaft 11 by the wheels 10 placed near the back corners of the frame. The front end is carried by a guide wheel 12 suitably trunnioned in a post 13 adapted to fit in and work through a sleeve 14 bridged across the front end of the main frame 1. A lever 15 is suitably pivoted near the top of post 13 and linked at 16 to the sleeve 14 to allow the raising or lowering of the front end of the main frame.

17 is a suitable tongue support to which may be fastened the usual tongue to guide the implement.

18 is any suitable clevis at the front end of the frame 1 for double trees or other suitable power attachment.

19 is a suitably two-way plow or lister having wings 20 fastened to a cross bar at the back of the plow and extending backward and spaced apart for the purpose hereinafter explained. Plow 19 is hitched to the cross piece 3 of the main frame by a beam 21 pivoted at 22. The back end of the plow beam 21 is adjustably supported in the subframe 2 by trusses 23 fastened to and extending from the sides of the subframe. This adjustment may be provided for by a series of holes in the opposite trusses and holes in a double casting 24 fitted upon beam 21. At the back end or crown of the plow beam 21 is fastened a vertical plate 25 with a series of holes near its back edge for adjustably supporting an inner subframe 26 hereinafter explained.

26 is a substantially rectangular inner subframe carrying the planter wheel and disks hereinafter described, and is adjustably connected to the plate 25 by a yoke 27 fastened to the front end of the inner subframe. The back end of inner subframe 26 is adjustably supported at its corners by yokes pinned to perforated posts 28 extending down from the back end of subframe 2. The posts 28 have a series of holes to allow of vertical adjustment of the back end of the inner subframe 26.

29 is the planter wheel proper and is revolubly mounted in the inner subframe 26 on a shaft 30. At the sides of the wheel 29 are disks 31 and 32 adjustably fastened to the inner sides of the subframe 26 and provided with cam tracks 33 and 34 for the control of the arms on the planter wheel as hereinafter explained.

The planter wheel 29 has a relatively wide rim and carries L shaped arms 35 and 36 pivoted at their elbows to the sides of the wheel. These arms are in two sets, one set being at one side of the wheel and the other set on the opposite side and extend radially outward beyond the periphery of the wheel and carry fingers forming hands to hold and carry the beets upon the rim or periphery of the wheel into their proper places in the furrow behind the plow. On the planter wheel shown in the drawings I have four pairs of planter arms to allow the setting of four beets at every revolution of the planter wheel. One arm of each pair is pivoted at one side of the wheel and the other arm of the pair is pivoted at the opposite side of the wheel with the pivots properly spaced to allow the holding of a sugar beet between the hands as hereinafter explained.

Having reference especially to Figs. 3, 4 and 5, 35 are the L shaped planter arms pivoted to the right side of the planter wheel adjacent to the disk 31, and 36 are the arms pivoted to the planter wheel on the left side adjacent to the disk 32. The fore-arms or fore parts of the arms 35 and 36 are constructed in suitable manner to allow them to give or spring with reference to the rigid parts of the arms and may be made of spring steel suitably fastened to rigid L shaped castings 35' and 36' respectively. The castings 35' and 36' are pivoted at their elbows to the sides of the planter wheel 29 and have roller wheels 37 and 38 respectively, pinned at the shoulder ends of the arms. Wheels 37 and 38 are pinned at the sides of their respective castings and are adapted to run in cam-ways 33 and 34 cast on the inner faces of the disks 31 and 32. The fore-arms or fore parts of planter arms 35 and 36 are oppositely bent at their outer ends to extend across above the outer face of planter wheel 29 and are provided at their outer ends with steel spring fingers 39 and 40 forming hands adapted to hold the beets in place upon the periphery of the wheel as hereinafter explained. The arms 35 and 36 on opposite sides of the wheel are properly spaced to allow the finger ends of the arms or hands to be properly spaced as indicated in Figs. 4 and 5. This spacing is provided for by properly locating the pivots for the arms on the sides of the planter wheel.

If the planter wheel 29 is made as a spoke wheel as indicated, the spokes are cast with bosses 41 and 42 extending out flush with the face of the wheel rim, a boss 41 extending backward and to the right of a spoke and the opposite boss 42 forward and to the left of the spoke.

The cam-ways 33 and 34 at the sides of the disks 31 and 32 are designed substantially as indicated in Figs. 3, 4 and 5 so that in the turning of the wheel 29 in the direction indicated by the arrows in Figs. 4 and 5, the roller wheels at the shoulder ends of the arms traveling in the cams properly control the outer ends or hands of the planter arms according to their position in the revolution of the wheel. Thus, when any particular pair of arms are at the top of the wheel the cams in the disks are so made as to hold the hands or fingers of that pair of arms apart as indicated in Figs. 1, 4 and 5 in a position to receive the beet. Then as the wheel turns forward (to the right in Figs. 1 and 5: to the left in Fig. 4) and the beet has been dropped head downward between the hands, as hereinafter explained, the cams will so guide the rollers as to quickly move the hands of a pair of planter arms together, pressing the steel spring fingers against the sides of the beet holding it in place until that pair of arms turns to the lower portion of their revolution, at which place the cams, as indicated in Figs. 4 and 5, will spread the hands of the planter arms to allow the beet to be freed from the wheel and stand in its position as the soil is pressed about it behind the plow.

The cam tracks 34 and 33 are so designed that the fingers on arm 36 holding the back side of the beet as it is placed in the furrow are lifted substantially clear of the beet while the fingers of the corresponding arm 35 at the front side are moved only slightly away from the beet and then made to press back against the beet and slide upward along the front side of the beet as the machine passes on, holding the beet in position as the soil is pressed inward around it, until the beet becomes firmly anchored in place in the furrow by the soil.

The planter wheel 29 is driven by a sprocket wheel 43 at the end of the shaft 30 and a suitable chain 44, as hereinafter explained. The sprockets provided to drive the planter wheel are made of proper size to make the peripheral velocity of the wheel 29 the same as the velocity of the planter moving forward, for reasons that will be made apparent.

45 are suitable filling blades or scrapers held in place slightly behind the center and at the sides of the planter wheel 29 and are adjustably held to subframe 2 by shanks 46 extending through castings 47 on the subframe 2.

48 are presser wheels mounted in a suitable framework 49 back of the main frame 1. The framework 49 is suitably pivoted to the back of frame 1 at 50. The pressure on the presser wheels 48 is controlled by any suitable spring control as by springs 51 on bolt 52 fastened to the framework 49 and controlled by lever 53.

54 is a suitable hopper to carry the beets to be planted and is supported on the main frame 1 in any suitable manner, as by legs 55.

56 is a belt or chain conveyer adapted to work over rollers 57 at the front and back of the hopper and at substantially the middle of the machine. This belt or chain conveyer 56 is preferably provided with drag links 58 at pre-determined distances along the conveyer to properly time the carrying of beets to the planter wheel, as hereinafter explained. At the front of the hopper 54 is a small secondary hopper 59 adapted to receive one beet at a time and located immediately in front and below the front end of conveyer 56 and may be supported in any suitable manner. I prefer to have this secondary hopper supported on the inner subframe in any suitable manner. The bottom of the secondary hopper 59 is open and a plurality of fingers 60 fastened to a bent arm 62 extend down the front side of the secondary hopper and are bent at their lower ends to extend under and form a movable bottom or grate across the lower open end of the hopper 59.

62 is an arm pivoted at the front side of the secondary hopper at 61 and bent downward and adapted to engage with a planter arm 36 when such arm 36 turns under the hopper 59. The fingers 60 and arm 62 are normally held in the position shown in Fig. 1 by any suitable spring as 63.

The conveyer 56 is driven from a gear sprocket 64 on the main shaft 11 through chain 65 working over a sprocket 66 on the shaft 67 of the front roller 57. A second sprocket 68 on the shaft 67 drives the chain 44 leading to the planter wheel shaft sprocket 43.

A suitable driver's seat 69 and foot rest 70 may be provided on the front portion of the implement. At the back of the machine are suitable platforms 71 upon which an attendant may ride. Two attendants are necessary in the operation of the machine, one as driver or attendant of the motive power and one to attend the feeding of beets on to the conveyer 56. The operator attending the feeding of beets upon the conveyer may ride upon platforms 71.

In operation, the beets are placed in hopper 54 and the plow 19, planter wheel 29 and filler blades 45 are properly adjusted for the size of beets to be planted and the depth of planting desired. The attendant at the back of the machine feeds one beet in front of each drag link of the conveyer or in each section of the conveyer, with the top of the beet forward. As the implement moves forward the conveyer 56 carries the beet forward dropping it top downward into the secondary hopper 59. As the planter wheel turns, the forward planter arm 36 of a pair of arms strikes the arm 62 carrying it forward (to the right in Fig. 1) opening the grate or bottom of the hopper 59, allowing the beet therein to drop downward upon the periphery of the planter wheel 29 between the hands of a pair of planter arms 35 and 36. The disks 31 and 32 are so placed that at the instant the beet drops upon the planter wheel the cams on the disks bring the hands or outer ends of the uppermost pair of feeder arms together, closing the fingers 39 and 40 upon the beet, holding it firmly in place upon the periphery of the wheel. As the implement moves forward and the planter wheel turns forward, the beet is carried down into the furrow behind the plow 19 and between the wings 20 of the plow. It will be understood that each pair of planter arms will be carrying a beet after they pass under the secondary hopper 59. As any pair of arms holding a beet against the planter wheel approaches the bottom of the furrow the planter arms are spread out by the cams as explained above, allowing the beet to settle in place in the bottom of the furrow as the soil slides and is pressed into the furrow around the back end of the wings 20 by scrapers 45. The presser wheels 48 passing along each side of the row of planted beets press the soil firmly in place as the implement moves forward.

As indicated above, the peripheral velocity of the planter wheel 29 is to be substantially the same as the velocity of the forward movement of the implement and the movement of the fingers pressing against the forward side of the beet is to be such that they will hold the beet in place when the soil is being scraped into the furrow.

When it is desired to lift the plow out of the ground and throw the implement out of operation the front end of the entire framework may be lifted by lever 15 and the back end of the subframe 2 is lifted by lever 9, thus raising the plow, planter wheel and scrapers as partially indicated by the dotted lines in Fig. 1. Suitable means are provided whereby the operation of lever 9 in lifting the back end of the subframe will throw gear sprocket 64 out of gear so that in the lifted position of the plow and planter wheel the conveyer and planter wheel are not operated.

I claim:

1. In a beet planter, the combination of a planter wheel adapted to receive beets for planting, a hopper arranged above said wheel having a movable bottom, means on said planter wheel to open said movable bottom as said wheel rotates and allow a beet to drop from said hopper onto said planter wheel, substantially as described.

2. In a beet planter a wide rim planter wheel, arms pivoted at the sides thereof extending radially outward from their pivots beyond the rim of said wheel, with hands at the outer ends of said arms to engage and carry beets on the rim of said wheel, substantially as described.

3. In a planter of the class described a framework carried on wheels, a wide rim planter wheel mounted in said framework, means to rotate said planter wheel when the planter is moved forward, arms arranged in pairs and pivoted at the sides of said planter wheel and extending radially outward beyond the rim thereof, with hands at the outer ends of said arms to grasp and carry beets on the rim of said wheel, with means to control said pivoted arms to open and close said pairs of hands at predetermined points in the revolution of said planter wheel.

4. An L shaped planter arm for the use described having a rigid part adapted to work on a pivot, a guide wheel pinned at the side of said rigid part, a spring forearm fastened to said rigid part of said arm having a hand at its outer end, substantially as described.

5. In a planter a planter wheel having arms pivoted in pairs at the sides of said wheel said arms extending from their pivots radially outward beyond the periphery of said wheel and bent at their outer ends over the periphery of said wheel, said outer ends of said arms having fingers fastened thereto to form hands, substantially as described.

6. In a planter a revoluble planter wheel mounted in a framework, L shaped arms pivoted in pairs at the sides of said wheel, the fore part of said arms extending outward beyond the periphery of said wheel and bent at their outer ends over the periphery of said wheel and having fingers to form hands, stationary camways arranged in said framework at the sides of said wheel, guide rollers on said L shaped arms adapted to extend into and run along said cam-ways when said planter wheel revolves, substantially as described.

7. In a planter a planter wheel revolubly mounted in a framework, L shaped arms pivoted at their elbows at the sides of said wheel, said arms being arranged in pairs and the arms of each pair being pivoted upon opposite sides of said wheel, the forearms of said L shaped arms extending radially outward beyond the periphery of said wheel and having fingers at their ends forming hands, cam-ways arranged in said framework at the sides of said wheel, guide rollers on the shoulder ends of said L shaped arms adapted to run in said cam-ways to control the relative position of said hands as said planter wheel revolves, substantially as described.

HENRY C. SPURGEON.

Witnesses:
  Geo. W. Butler,
  Julius E. Bump.